United States Patent [19]
Abusleme et al.

[11] Patent Number: 5,962,610
[45] Date of Patent: Oct. 5, 1999

[54] ETHYLENE FLUORO-CONTAINING COPOLYMERS

[75] Inventors: Julio A. Abusleme, Saronno; Vincenzo Arcella, Novara; Giambattista Besana, Mariano Comense, all of Italy

[73] Assignee: Ausimont S.p.A., Milan, Italy

[21] Appl. No.: 08/888,286

[22] Filed: Jul. 3, 1997

[30] Foreign Application Priority Data

Jul. 5, 1996 [IT] Italy ................................. MI96A1381

[51] Int. Cl.$^6$ ....................................................... C08F 2/00
[52] U.S. Cl. ............................................ 526/206; 526/249
[58] Field of Search ...................................... 526/206, 249

[56] References Cited

U.S. PATENT DOCUMENTS

| | | |
|---|---|---|
| 3,624,250 | 11/1971 | Carlson . |
| 3,767,634 | 10/1973 | Scoggins . |
| 3,847,881 | 11/1974 | Mueller et al. . |
| 3,865,845 | 2/1975 | Resnick . |
| 4,513,129 | 4/1985 | Nakagawa . |
| 4,590,234 | 5/1986 | Tasaka et al. . |
| 4,730,029 | 3/1988 | Wachi et al. . |
| 4,789,717 | 12/1988 | Giannetti . |
| 4,864,006 | 9/1989 | Giannetti . |
| 5,021,516 | 6/1991 | Wheland . |
| 5,182,342 | 1/1993 | Feiring et al. . |

FOREIGN PATENT DOCUMENTS

| | | |
|---|---|---|
| A073087 | 3/1983 | European Pat. Off. . |
| A076581 | 4/1983 | European Pat. Off. . |
| A080187 | 6/1983 | European Pat. Off. . |
| A095077 | 11/1983 | European Pat. Off. . |
| A185241 | 6/1986 | European Pat. Off. . |
| A185242 | 6/1986 | European Pat. Off. . |
| A186215 | 7/1986 | European Pat. Off. . |
| A526216 | 2/1993 | European Pat. Off. . |
| A612767 | 8/1994 | European Pat. Off. . |
| A625526 | 11/1994 | European Pat. Off. . |
| A673951 | 9/1995 | European Pat. Off. . |
| A673952 | 9/1995 | European Pat. Off. . |
| 0712882 | 5/1996 | European Pat. Off. . |
| 0720991 | 7/1996 | European Pat. Off. . |

*Primary Examiner*—Bernard Lipman
*Assistant Examiner*—N. Sarofim
*Attorney, Agent, or Firm*—Nikaido Marmelstein Murray & Oram, LLP

[57] ABSTRACT

Ethylene fluoro-containing copolymers of the ECTFE and ETFE type, optionally in the presence of a third comonomer in amount comprised between 0.1 and 10% by moles, having a viscosity between $10^2$ and $10^5$ Pa.sec with shear rates of $1\ sec^{-1}$ measured at the temperature of about 30° C. higher than the second melting temperature, and having a rheologic curve in the diagram shear viscosity/shear-rate with a slope higher than 200, calculated as ratio between the viscosity in Pa.sec and the shear-rate in $sec^{-1}$ in the shear-rate range comprised between 1 and 10 $sec^{-1}$, and having a processability zone with shear-rate values higher than 10 $s^{-1}$.

11 Claims, No Drawings

ETHYLENE FLUORO-CONTAINING COPOLYMERS

The present invention relates to ethylene fluoro-containing copolymers having a good processability and high mechanical properties.

More particularly the fluoro-containing copolymers are ethylene copolymers with TFE (tetrafluoroethylene) (ETFE) or ethylene copolymers with CTFE (chlorotrifluoroethylene) (ECTFE). The commercial name of ECTFE is Halar®.

It is known that modified and non modified fluoro-containing copolymers of ECTFE (ethylene-chilorotrifluoroethylene), and of modified ETFE (see the modifiers mentioned hereinafter), have good mechanical properties which however dramatically decay with the decrease of the melt viscosity (low molecular weights). Unfortunately the use of these products having higher molecular weights than those used at present, for pipes, sheets, and cables, is not possible owing to the impossibility to process them in the conventional machines currently used, as it is explained in detail later on.

As known, said machines work with a shear-rate from 1 to 10000 sec$^{-1}$ of the melt, preferably from 1 to 1000 sec$^{-1}$.

For instance the Halar products available in the market are 900, 300 and 500 type, which differ in melt viscosity (the Melt Flow Indec (MFI)). The 900 type is characterized by having a very high molecular weight (low MFI), and therefore good mechanical characteristics, however it has the drawback that it cannot be processed with shear-rates higher than about 40 sec$^{-1}$, it is generally utilized from 1 to 20 sec$^{-1}$. Indeed if one exceeds this shear-rate, the manufactured article shows a certain roughness and/or the melt shows instability phenomena in processing which does not allow the obtainment of the manufactured article. Therefore the productivity of these processes is very low.

Therefore it is defined window or processability zone the shear-rate range of the melt rheological curve (shear viscosity/shear-rate) wherein surface roughness phenomena and/or flow instability do not appear Generally the viscosity measurement is carried out at temperatures of about 30° C.–50° C. higher than the second melting temperature of the copolymer.

Moreover if cables are desired to be prepared, it is not possible to obtain them with the 900 grade because the cables lines work at with higher shear-rates, generally higher than 100 sec$^{-1}$.

The present available alternative was to use the 500 grade for cables. The 500 grade has a very low viscosity compared with the 900, and has a processability window between 100–500 sec$^{-1}$. However the mechanical properties are much lower with respect to the 900 grade, especially at high temperatures, wherefore the cables do not show good mechanical properties.

The 300 grade has an intermediate viscosity between 900 and 500, therefore it has superior mechanical properties in comparison with the 500, however not yet sufficient to give an optimal properties profile. Besides the processability window is not yet sufficiently wide, indeed one can process up to a maximum of 60 sec$^{-1}$. Therefore it cannot be used for cables.

Therefore it would be desirable to have available a grade similar to the 900 one (good mechanical properties) but with a processability window in the zone of the 500 type. There is no product in the market capable of meeting these requirements.

On the other hand if superior mechanical properties than those of the 900 grade are desired, this is not possible. This is due to the narrow processability window of the product, which would have a higher molecular weight than the 900 grade, bringing down the productivity, since it is necessary to shift towards the lower limit of the processability range in which the machines work. An example of this application consists in preparing pipes with very high performances, such as good mechanical resistance, even when subjected to thermal cycles at high temperature; and sheets in thermoformable processes.

The Applicant has surprisingly found that it is possible to synthesize ECTFE and ETFE ethylene fluoro-containing copolymers under such conditions as to obtain products having a good processability combined with excellent mechanical properties, especially at high temperatures, generally from 100 to 200° C., preferably from 140 to 180° C.

The processability of the copolymers of the invention is possible at shear-rates higher than 100 sec$^{-1}$ as the 500 grade but with much higher mechanical properties, similar or even superior to the 900 grade. In particular to make Halar cables, the copolymers of the invention having a melt viscosity lower than $10^4$ Pa.sec at shear-rate of 1 sec$^{-1}$, preferably higher than $10^2$, measured at the temperature of 275° C., are used. The viscosity measurement is generally carried out at temperatures of about 30° C.–50° C. higher than the second melting temperature of the copolymer.

In the case of pipes and sheets, for instance, the processability of the copolymers is possible at shear-rates lower than 60 sec$^{-1}$ as the 300 grade but with mechanical properties clearly superior to the 900. In particular to make these Halar articles, the copolymers of the invention having a melt viscosity lower than $10^5$ Pa.sec with shear-rates of 1 sec$^{-1}$, and preferably higher than $10^3$, measured at the temperature of 275° C., are used. The measurement of the viscosities is generally carried out at temperatures of about 30°–50° C. higher than the second melting temperature of the copolymer.

The copolymers of the invention, optionally in the presence of one or more comonomers, the total amount of which is comprised between 0.1 and 10% by moles, show a viscosity between $10^2$ and $10^5$ Pa.sec with shear rates of 1 sec$^{-1}$ measured at the temperature of about 30°–50° C. higher than the second melting temperature, and show a rheologic curve in the diagram shear viscosity/shear-rate having a gradient higher than 200, calculated as ratio between the viscosity in Pa.sec and the shear-rate in sec$^{-1}$ in the shear-rate range comprised between 1 and 10 sec$^{-1}$, said curve having a processability zone with shear-rate values higher than 10 s$^{-1}$, preferably higher than 50 sec$^{-1}$.

The copolymers of the invention generally show a molecular weight distribution of bimodal type, i.e. they contain a polymeric fraction of low molecular weight having a viscosity comprised between 1 and $5.10^3$ Pa.sec measured as above. Said low molecular weight fraction being generally comprised between 5 and 60% by weight, preferably between 30 and 55% by weight; the remaining part having a higher molecular weight and being in amounts corresponding to the complement to 100% by weight.

The high and low molecular weight distributions can be more or less broad, and/or more or less close, which show the contemporaneous presence of polymers having different molecular weight, one with a prevalence of low molecular weights and the other with a prevalence of high molecular weights.

Generally the measurement of the molecular weights of the polymers of the invention, as known, is hardly feasible because of the poor solubility of the fluoro-containing ethylene copolymers in solvents, for instance methylethylketone (MEK), at room temperature. Therefore the gel permeation chromatography (GPC) for determining the molecular weights cannot be utilized.

The flow curve, indicated above, shear viscosity/shear-rate, is measured according to ASTM D3835.

A process utilizable for the synthesis of the copolymers of the invention consists in modifying the processes for preparing Halar, see for instance the European patents EP 673 952 and 673 951 in the name of the Applicant, that is by polymerizing the comonomers for 40–95% by weight on the total of the obtained polymer, then by adding the transfer agent for preparing the low molecular weight fraction as defined above.

In the polymerization phase without transfer agent high molecular weights are produced.

During the preparation phase of the high molecular weights, an amount of chain transfer agent, generally lower than 20% of the total utilized in preparing the final copolymer, could be also present.

The preferred system is to operate in absence of chain transfer agents, or in the presence of chain transfer agents in amounts less than 1% by weight with respect to the total monomers, preferably less than 0.2% by weight, for the preparation of the high molecular weight fraction, in particular for pipes, specifically to make flexible pipes for the petroleum transport to be utilized at high sea depths.

The skill man in the art can easily find other processes to prepare the copolymers of the invention, allowing to obtain the high and low molecular weights fractions in the above indicated ratios. For instance by modifying the synthesis conditions, in semi-batch or continuous polymerization process.

An example of semi-batch process is the one in which temperature and pressure conditions change during the reaction in order to produce the desired high and low molecular weight fractions.

In the case of continuous process, two cascade polymerization reactors can be utilized wherein in the former the polymerization conditions are such as to produce the low molecular weight fraction and in the latter the synthesis conditions allow the formation of the high molecular weight fraction.

The low molecular weight fraction viscosity can be estimated according to a method set up by the Applicant, i.e. by a priori drawing through experiments a calibration curve viscosity v. The amount of chain transfer agent in terms of concentration referred to the reaction medium, for instance water in the case of the polymerization in emulsion, the organic phase (or part thereof) in the case of the polymerization in suspension. It is to be noticed that the organic phase can be formed only by the monomers of by the monomers and organic solvents. See Example 1 for a detailed description of this procedure.

The chain transfer agents which can be mentioned are for instance: ketones, esters, ethers or aliphatic alcohols having from 3 to 10 carbon atoms; hydrocarbons or halogen-containing hydrocarbons, having from 1 to 6 carbon atoms; bis(alkyl)carbonates wherein the alkyl has from 1 to 5 carbon atoms; etc. Among them, chloroform and methylcyclopentane are particularly preferred. The total amount of the utilized chain transfer agent can range within rather wide limits, depending on the type of monomers used, on the reaction temperature and pressure. Generally, such amount ranges from 0.01 to 30% by weight, preferably from 0.05 to 10% by weight, with respect to the total amount of monomers introduced in the reactor.

As modifying comonomers of the copolymers of the invention can be mentioned those well known in the art such as for instance a fluoro-containing vinylic comonomer, as a (per)fluoroalkylvinylether wherein the alkyl has 1–4 carbon atoms, in particular perfluoropropylvinylether, see U.S. Pat. No. 3,624,250. Other possible comonomers, alternative to the previous ones, having for instance the formula R—CH═CH$_2$, wherein R is a perfluoroalkyl or a pefluoroalkoxyperfluoroalkyl, are described in the patents EP 185.241, EP 185.242, U.S. Pat. No. 3,847,881, U.S. Pat. No. 4,513,129.

The Applicant has found that also other modifying comonomers such as fluorodioxoles can be used, see for instance the patents U.S. Pat. No. 3,865,845, EP-76,581, EP-80,187, EP-95,077, EP-73,087; the European patent application EP 720,991, in particular 2,2,4,-trifluoro-5-trifluorometoxy-1,3-dioxole (TTD).

The copolymer of the present invention comprises:
(a) from 30 to 70%, preferably from 40 to 60%, by moles of ethylene;
(b) from 30 to 70%, preferably from 40 to 60%, by moles of a fluoro-containing monomer selected from tetrafluoroethylene, chlorotrifluoroethylene, or their mixtures;
(c) from 0.1 to 10%, preferably from 0.3 to 5%, even more preferably from 0.5 to 2.5% by moles with respect to the total amount of monomers (a) and (b), of a modifying monomer as indicated above.

The copolymers object of the present invention can be prepared according to known techniques, by copolymerization of the corresponding monomers, in suspension in organic medium or in aqueous emulsion, in the presence of a suitable radical initiator, at a temperature comprised between −60° and +150° C., preferably between −20° and +100° C. The reaction pressure is generally comprised between 0.5 and 100 bar, preferably between 5 and 40 bar.

Among the various radical initiators, can be in particular employed:
(i) bis-acylperoxides of formula $(R_f\text{—CO—O})_2$, wherein $R_f$ is a (per)haloalkyl $C_1$–$C_{10}$ (see for instance the patents EP-185,242 and U.S. Pat. No. 4,513,129), or a perfluoropolyoxyalkylenic group (see for instance the patents EP-186,215 and U.S. Pat. No. 5,021,516); among them, bis-trichloroacetylperoxide and bis-dichlorofluoroacetylperoxide are particularly preferred;
(ii) dialkylperoxides, of which diterbutylperoxide (DTBP) is particularly preferred;
(iii) -water-soluble inorganic peroxides, such as persulphates or ammonium or alkaline metals persulphates; ammonium or potassium persulphate is particularly preferred;
(iv) dialkylperoxydicarbonates, wherein the alkyl has From 1 to 8 carbon atoms, such as for instance di-n-propyl-peroxydicarbonate and di-isopropyl-peroxydicarbonate (see the patent EP-526,216);
(v) organic or inorganic redox systems, such as ammonium persulphate/sodium sulphite, hydrogen peroxide/aminoiminomethansulphinic acid, etc.

In the case of suspension polymerization, the reaction medium is formed by an organic phase, to which water is usually added in order to favour the heat dispersion occurring during the reaction. The organic phase can be formed by the monomers themselves, without addition of solvents, or by the monomers dissolved in a suitable organic solvent. As organic solvents chlorofluorocarbons are conventionally employed, such as:
$CCl_2F_2$ (CFC-12), $CCl_3F$ (CFC-11), $CCl_2FCClF_2$ (CFC-113), $CClF_2CClF_2$ (CFC-114), etc. Since such products have a destroying effect on the ozone present in the stratosphere, alternative products have been lately proposed, such as the compounds containing only carbon, fluorine, hydrogen, and optionally oxygen, described in the patent U.S. Pat. No. 5,182,342. A valid alternative are branched chain hydrocarbons described in the patent application EP 612,767, having from 6 to 25 carbon atoms and a ratio between methyl groups and number of carbon atoms higher than 0.5, such as for instance 2,3-dimethylbutane, 2,3-dimethylpentane, 2,2,4-trimethylpentane, 2,2,4,6,6-pentamethylheptane, 2,2,4,4,6-pentamethylheptane, etc., or their mixtures.

In the case of (co)polymerization in aqueous emulsion, the presence of a suitable surfactant is required. The most commonly used are the fluoro-containing surfactants having the formula:

$$R_f\text{—}X^-M^+$$

wherein $R_f$ is a (per)fluoroalkylic chain $C_5$–$C_{16}$ or a (per)fluoropolyoxyalkylenic chain, $X^-$ is —$COO^-$ or —$SO_3^-$, $M^+$ is chosen from: $H^+$, $NH_4^+$, an alkaline metal ion. Among them we mention: ammonium and/or sodium perfluoro-octanoate, (per)fluoropolyoxyalkylenes terminated with one or more carboxylic groups, etc.

The process object of the present invention can be advantageously carried out in the presence of emulsions or micro-emulsions of perfluoropolyoxyalkylenes, according to the patents U.S. Pat. No. 4,789,717 and U.S. Pat. No. 4,864,006, or also of microemulsions of fluoropolyoxyalkylenes having hydrogen-containing end groups and/or hydrogen-containing repeating unites, optionally in admixture with an hydrocarbon, according to the European patent application EP 625,526 and EP 712,882 in the name of the Applicant.

Some working examples of the present invention are reported hereinafter, the purpose of which is merely illustrative but not limitative of the scope of the invention.

EXAMPLE 1

In a 18 liter enameled autoclave equipped with baffles and stirrer working at 450 rpm in Hastelloy C, 4.3 l of demineralized water, 1.7 l (1.36 kg) of methylic alcohol, 685 g of perfluoropropylvinylether and 3 kg of chlorotrifluoroethylene were introduced. Then the temperature was brought to 5° C. Then ethylene was fed up to a pressure of 11.35 absolute bar. In the autoclave the radical initiator was then introduced, under the form of a solution, maintained at −17° C., of trichloroacetylperoxide (TCAP) in isooctane having a titre reported in the Table, with a flow-rate of 7.5 cc/hour up to a consumption of ethylene of 125 g. At this conversion 40 ml of chloroform were introduced and successively the flow-rate of initiator was increased to 60 cc/hour.

The pressure was maintained constant for the whole time of the polymerization by continuously feeding ethylene in the reeactor up to a consumption of 250 g. The other reaction parameters, the Melt Flow Index (MFI) according to ASTM 3275-89 and the second melting temperature (Tm (II)) determined by differential scanning calorimetry (DSC) of the obtained polymer are reported in the Table.

The mechanical properties at 175° C. reported in the Table were obtained according to ASTM D1708, by utilizing compression molded plaques.

The flow curve (shear viscosity/shear-rate) of the polymer was made at 275° C. according to ASTM D3835 in the 1–1000 $s^{-1}$ range, from which the processability window and the slope determined between 1 and 10 $sec^{-1}$ of shear-rate are obtained.

Obtainment of the Low Molecular Weights Fraction Viscosity

1. Obtainment of the calibration curve

Various products were polymerized by introducing in the autoclave different amounts of chloroform only at the beginning, so as to have different concentration ratios between chloroform (ml) and chlorotrifluoroethylene (kg). The operating conditions of the reactions (pressure and temperature) are those of the examples. Such synthesized products were characterized from the rheologic point of view by evaluating in particular the shear viscosity at the shear-rate of 1 $sec^{-1}$ (at 275° C.).

In this way a viscosity-concentration ratio curve is obtained, wherefore by regression the following formula for the viscosity η in Pa.sec is obtained:

$$\eta(a\ 1s^{-1}) = 24000 \cdot \exp\left\{-0.25 \cdot \left[\frac{\text{ml CHCl}_3}{\text{Kg CTFE}}\right]\right\} \qquad (I)$$

2. Evaluation of the Viscosity

The viscosity evaluation of the low molecular weight fraction is obtained by calculating the concentration ratio between chloroform and chlorotrifluoroethylene remaining in the reaction at the time of the addition of the chloroform. For instance, for the reaction of Example 1, the remaining amount of CTFE is about 2.2 kg, from the mass balance, consequently introducing 40 ml of $CHCl_3$ in the autoclave obtaining a ratio of 18.2 ml/kg. Therefore from equation (I) a viscosity of 255 Pa.s. is obtained.

EXAMPLE 2

Test of Pipe Extrusion

The polymer of Example 1 was used, the necessary amount of which for the extrusion was obtained by various polymerizations.

The polymer was processed in a singlescrew extruder having a diameter of 45 mm with a die of internal diameter of 54.7 mm and external diameter of 65.66 mm. The operating conditions of the extrusion test are the following:
screw rate=60 rpm
flow-rate=25 kg/hour
line speed=0.6 m/min
melt temperature=280° C.

In this way a pipe having a diameter of 50 mm with a thickness of 3.2 mm was obtained. The pipe has a smooth surface inside and outside, with mechanical properties practically equal to those described in Example 1.

EXAMPLE 3

Example 1 was repeated except that at the conversion of 125 g, 60 ml of chloroform were introduced.

EXAMPLE 4

In an enameled autoclave equipped with baffles and stirrer working at 450 rpm in Hastelloy C, 4.3 l of demineralized water, 1.7 l of methylic alcohol, 300 g of 2,2,4-trifluoro-5-trifluorometoxy-1,3-dioxole (TTD) and 3 kg of chlorotrifluoroethylene were introduced. The autoclave is brought then to the reaction temperature of 5° C.

Then ethylene was fed up to a pressure of 11.35 absolute bar. In the autoclave the radical initiator was then introduced, under the form of a solution, maintained at −17° C. of trichloroacetylperoxide (TCAP) in isooctane having the titre reported in the Table, with a flow-rate of 7.5 cc/hour up to an ethylene consumption of 175 g.

At this conversion 54 ml of chloroform were introduced and successively the flow-rate of initiator was increased to 60 cc/hour.

The pressure was maintained constant for the whole time of the polymerization by continuously feeding ethylene in the reactor up to a consumption of 250 g. The other reaction parameters, the Melt Flow Index (MFI), the second melting temperature (Tm (II)), the mechanical properties at 175° C. and the polymer processability window are reported in the Table.

EXAMPLE 5 (comparative)

Example 4 was repeated except that 5 ml of chloroform were introduced after the addition of the methylic alcohol, while no amount of chloroform during the reaction was added and the flow-rate of the radical initiator was always kept at 7.5 cc/hour.

EXAMPLE 6

The polymer of Example 1 was processed in a single-screw extruder having a diameter of 45 mm equipped with a flat head to produce sheets. The test operating conditions are the following:
Screw rate: 35 rpm
Line speed: 0.6 m/min
Melt temperature: 275° C.
Calender temperature: 225° C.
A sheet having a thickness of 1 mm was thus obtained.

EXAMPLE 7

The sheet of Example 6 was thermoformed at 170° C. and 185° C. and at two forming rates of 1 mm/min and 50 mm/min. Fractures have not been noticed in anyone of the four cases.

EXAMPLE 8

The polymer of Example 1 was processed in a single-screw extruder having a diameter of 38 mm equipped with a die having an internal diameter of 2.1 mm and an external diameter of 3.2 mm.
The test operating conditions are the following:
Screw rate: 33 rpm
Line speed: 160 m/min
Melt temperature: 286° C.
A wire having the conductor (copper) of 0.8 mm diameter and insulator thickness of 0.22 mm was thus obtained.

EXAMPLE 9

Example 1 was repeated except that 0.5 ml of chloroform have been fed after addition of methyl alcohol.

TABLE 1

| EXAMPLE | 1 | 3 | 4 | 5 (comp) | 9 |
|---|---|---|---|---|---|
| Reaction time, min | 290 | 360 | 304 | 300 | 350 |
| Rp (polymer g/min) | 7.2 | 6.2 | 7.4 | 6.8 | 6.3 |
| TCAP titre solution (g TCAP/ml) | 0.09 | 0.13 | 0.13 | 0.11 | 0.10 |
| Characterization | | | | | |
| MFI (5 kg) (g/10') | 0.6 | 1.9 | 0.4 | 0.3 | 1.0 |
| Tm (II) ° C. | 229 | 230 | 229 | 229 | 229 |
| η (a 1s$^{-1}$) (Pa · s) | 4.5 · 10$^4$ | 2.5 · 10$^4$ | 4 · 10$^4$ | 4.5 10$^4$ | 3.2 10$^4$ |
| $^{(1)}$η (a 1s$^{-1}$) (Pa · s) | 255 | 30 | 20 | — | 255 |
| Processability window (s$^{-1}$) | 1–700 | 1–1000 | 90–500 | $^{(2)}$1–5 | 1–700 |
| Flow curve slope between 1 and 10 sec$^{-1}$ (Pa · s$^2$) | 2890 | 1250 | 3860 | 3330 | 2777 |
| Mechanical properties at 175° C. | | | | | |
| Elastic modulus, MPa | 16 | 20 | 19 | 23 | 15 |
| Yield point, MPa | 1.7 | 1.8 | 1.9 | 2.3 | 1.6 |
| Yield elongation, % | 48 | 40 | 40 | 50 | 35 |
| Stress at break, MPa | 5.8 | 5.1 | 4.6 | 4.2 | 5.3 |
| Elongation at break, % | 850 | 920 | 680 | 500 | 908 |

$^{(1)}$values evaluated with equation (I) for the low molecular weigh fraction
$^{(2)}$the extruded product shows a slight roughness

We claim:

1. Process for the synthesis of ECTFE and ETFE fluoro-containing copolymers having a bimodal molecular weight distribution comprising polymerizing the respective comonomers until 40–95% by weight on the total of the polymer is obtained, and then adding a chain transfer agent for preparing a low molecular weight fraction of the distribution.

2. Process for the synthesis of the copolymers according to claim 1, wherein in the phase of preparation of the high molecular weights an amount of chain transfer agent, lower than 20% by weight of the total utilized in the preparation of the final copolymer product, is present.

3. Process for the synthesis of the copolymers according to claim 1, wherein in the preparation phase of the high molecular weights one operates in absence of chain transfer agents, or in the presence of chain transfer agents in amount less than 1% by weight with respect to the total monomers.

4. Process for the synthesis of the copolymers according to claim 1, wherein the chain transfer agents are chosen from: ketones, esters, ethers or aliphatic alcohols having from 3 to 10 carbon atoms; hydrocarbons or halogen-containing hydrocarbons, having from 1 to 6 carbon atoms; bis(alkyl)carbonates in which the alkyl has from 1 to 5 carbon atoms.

5. Process for the synthesis of the copolymers according to claim 4, wherein the chain transfer agents are chloroform or methylcyclopentane.

6. Process for the synthesis of the copolymers according to claim 4, wherein the total amount of chain transfer agent employed ranges from 0.01 to 30% by weight with respect to the total amount of monomers.

7. Process for the synthesis of the copolymers according to claim 6 wherein the total amount of chain transfer agent employed ranges from 0.05 to 10% by weight.

8. Process for the synthesis of the copolymers according to claim 1, further comprising the presence of one or more additional comonomers, the total amount of which is comprised between 0.1 and 10% by moles, having a viscosity between $10^2$ and $10^5$ Pa.sec with shear rates of 1 sec$^{-1}$ measured at the temperature of about 30°–50° C. greater than the second melting temperature, and having a rheologic curve in the diagram shear viscosity/shear-rate having a slope greater than 200, calculated as a ratio between the viscosity in Pa.sec and the shear-rate in sec$^{-1}$ in the shear-rate range comprised between 1 and 10 s$^{-1}$, said curve having a processability zone with shear-rate values higher than 10 sec⁻; said one or more modifying comonomers is selected from the group consisting of: a fluoro-containing vinylic comonomer, comonomers of formula R—CH=CH$_2$, wherein R is a perfluoroalkyl or a perfluoroalkoxy-perfluoroalkyl and fluorodioxoles.

9. Process for the synthesis of the copolymers according to claim 8, wherein the modifying comonomer is chosen from 2,2,4-trifluoro-5-trifluoromethoxy-1,3-dioxole (TTD), (per)fluoroalkylvinylethers wherein the alkyl has 1–4 carbon atoms, in particular perfluoropropylvinylether.

10. Process for the synthesis of the copolymers according to claim 1, wherein the obtained copolymer comprises:
(a) from 30 to 70% by moles of ethylene;
(b) from 30 to 70% by moles of a fluoro-containing monomer chosen from tetrafluoroethylene, chlorotrifluoroethylene, or their mixtures;
(c) from 0.1 to 10% by moles with respect to the total amount of monomers (a) and (b), of a modifying monomer of the previous claims.

11. Process for the synthesis of the copolymers according to claim 10, wherein the copolymer obtained comprises:
(a) from 40 to 60% by moles of ethylene;
(b) from 40 to 60% by moles of a fluoro-containing monomer selected from tetrafluoroethylene, chlorotrifluoroethylene, or their mixtures;
(c) from 0.5 to 2.5% by moles with respect to the total amount of monomers (a) and (b), of a modifying monomer of the previous claims.

* * * * *